United States Patent [19]
Thirsk

[11] Patent Number: 5,471,990
[45] Date of Patent: Dec. 5, 1995

[54] ULTRASONIC DOPPLER POWER MEASUREMENT AND DISPLAY SYSTEM

[75] Inventor: Graham Thirsk, Lynnwood, Wash.

[73] Assignee: Advanced Technology Laboratories, Inc., Bothell, Wash.

[21] Appl. No.: 344,261

[22] Filed: Nov. 23, 1994

[51] Int. Cl.$^6$ ........................................... A61B 8/00
[52] U.S. Cl. ........................................... 128/661.09
[58] Field of Search .................. 128/660.07, 661.08, 128/661.09, 661.10, 662.01; 73/861.25, 631; 601/2

[56] References Cited

U.S. PATENT DOCUMENTS

| | | | |
|---|---|---|---|
| 5,063,931 | 11/1991 | Leavitt | 128/661.07 |
| 5,233,994 | 8/1993 | Shmulewitz | 128/661.08 |
| 5,287,753 | 2/1994 | Routh et al. | 128/661.08 |

*Primary Examiner*—George Manuel
*Attorney, Agent, or Firm*—W. Brinton Yorks, Jr.

[57] ABSTRACT

An ultrasonic diagnostic imaging system is provided which calibrates and quantifies colors of a color power Doppler display to produce quantified measurements of Doppler power intensity. The colors of a color power Doppler image are divided into discrete colors and each color assigned a quantified measure of the Doppler power intensity indicated by that color. When a user moves a cursor over the image the system compares the color of the pixel where the cursor is located with the range of colors and their quantified measures and produces a quantified measure of the Doppler power intensity at the location of the cursor. A line of such measures across a blood vessel can be used to plot a profile of Doppler power intensity across the vessel, and an index number which is a measure of perfusion in a region of the body is determined from an area of a color power Doppler image.

9 Claims, 4 Drawing Sheets

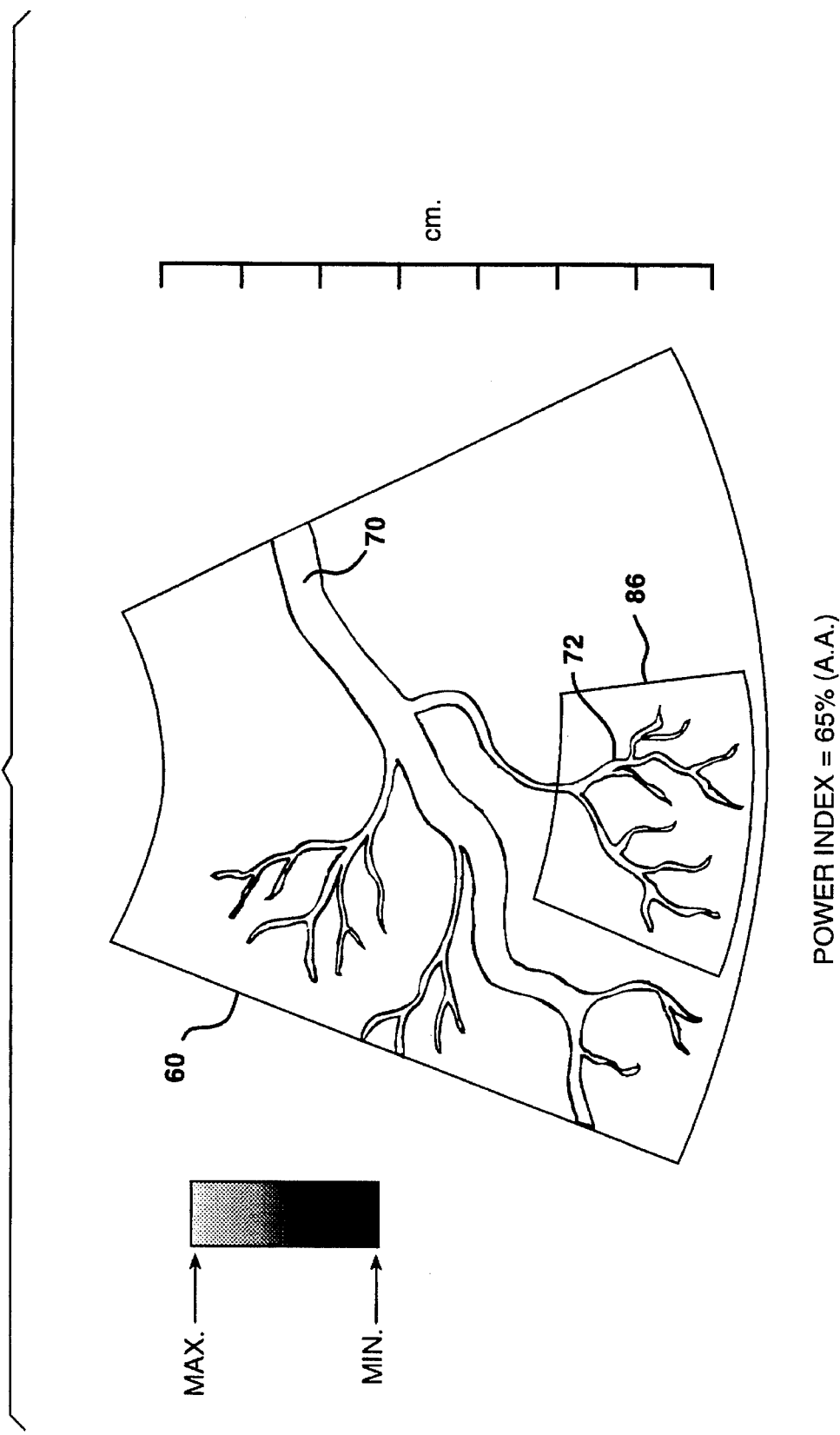

ULTRASONIC DOPPLER POWER MEASUREMENT AND DISPLAY SYSTEM

This invention relates to improvements in ultrasonic diagnostic techniques, and in particular to the measurement of flow conditions within the body through ultrasonic Doppler power quantification.

For a number of years ultrasonic diagnostic imaging systems have been commercially available which provide an indication of flow conditions within the body by what has become known as color Doppler velocity imaging. As is well known, this technique involves the acquisition of Doppler data at different locations called sample volumes over the image plane of an ultrasonic image. The Doppler data is acquired over time and used to estimate the Doppler phase shift or frequency at each discrete sample volume. The Doppler phase shift or frequency corresponds to the velocity of fluid flow in vessels within the body, with the polarity of the shift indicating direction of flow. This information is color coded in accordance with the magnitude of the shift (velocity) and its polarity, and overlaid over a structural image of the image plane. The colors in the image thereby provide an indication of the speed of blood flow and its direction in blood vessels, for instance.

Recently there has been commercial activity in a different form of Doppler display referred to as color power Doppler. This technique is unconcerned with estimations of the velocity of fluid flow. Rather, it focuses simply on the intensity of the received signals which exhibit a Doppler shift. This Doppler signal intensity can also be computed for each sample volume in an image plane and displayed in a color variation. Unlike color Doppler velocity imaging, color power Doppler does not present the problems of directionality determination, aliasing, and low sensitivity which are characteristic of velocity imaging. Color power Doppler simply displays the Doppler signal intensity at a sample volume in a coded color. Since the value at each sample volume can be averaged over time or based upon a peak value, the color power Doppler display usually appears to be a more stable display of flow conditions in the body.

The clinical utility of color power Doppler is still being investigated in an effort to fully understand the relationships between the color power Doppler display and flow conditions in the body. The color power Doppler display may find use where it is desirable to assess blood perfusion in an organ or structure in the body. For instance, the technique may be useful in assessing perfusion in the uterine wall as an aid to diagnosing potential fetal growth problems. The technique may be useful in assessing perfusion in the fetal head as an aid to diagnosing conditions affecting fetal development.

However, the utility of color power Doppler is limited by the qualitative nature of color power Doppler displays and the lack of quantification which would more directly bear on physiological conditions within the body. It would be desirable for clinicians to have color power Doppler systems which quantify color power Doppler information in a manner that presents a more precise and comparable basis for perfusion assessment.

In accordance with the principles of the present invention an ultrasonic power Doppler display system is provided which calibrates power Doppler estimates to a common system of quantification. A threshold for selecting valid power Doppler estimates may also be established. The quantified values are used to objectively measure and display flow information including the Doppler power at a specific point in the body, the Doppler power profile along a selected line or plane, and a Doppler power index over a specified image area or volume. These objective measures provide clinicians with specifically quantified measures of blood perfusion in the body.

In the drawings:

FIG. 5 illustrates the graphical definition of a portion of a color power Doppler image for determination of a Doppler power index.

Figure 1:
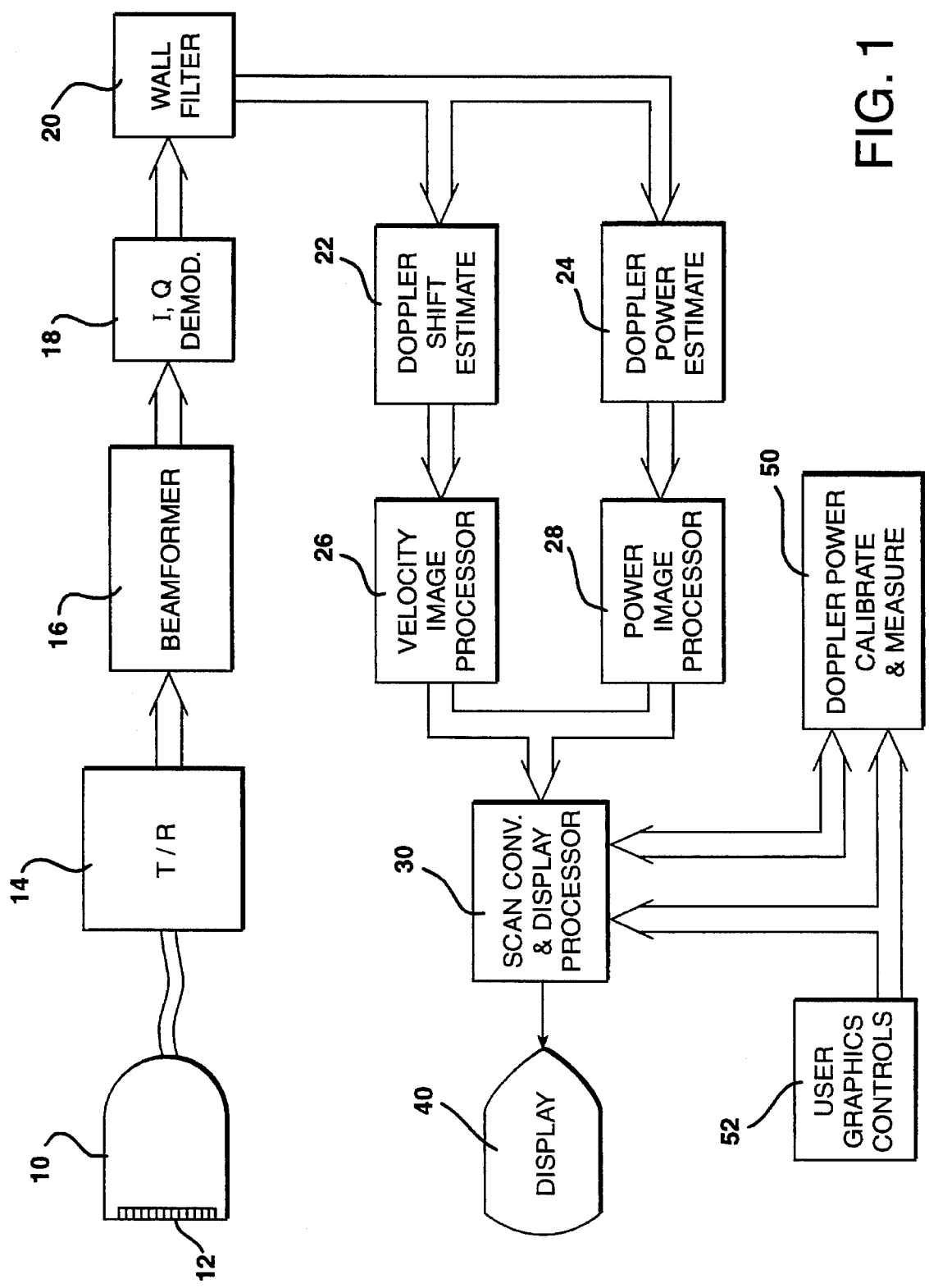
FIG. 1 illustrates in block diagram form the Doppler processing portion of an ultrasonic diagnostic system constructed in accordance with the principles of the present invention.

Referring first to FIG. 1 an ultrasonic diagnostic imaging system constructed in accordance with the principles of the present invention is shown in block diagram form. An ultrasonic probe 10 includes a multielement transducer 12 which transmits waves of ultrasonic energy into the body of a patient and receives ultrasonic echoes returning from structures such as vessels in the body. In the case of ultrasonic wave transmission for Doppler interrogation of the body, it is the echoes returning from blood and other fluids in the body that are of interest. The ultrasonic probe 10 is connected to a transmitter/receiver 14 which alternately pulses individual elements of the transducer to shape and steer an ultrasonic beam, and receives, amplifies and digitizes echo signals received by the transducer elements.

The transmitter/receiver 14 is coupled to a beamformer 16 which controls the times of activation of specific elements of the transducer 12 by the transmitter/receiver. This timing enables the transducer 12 to transmit a shaped and focused ultrasound beam in a desired direction. The beamformer 16 also receives the digitized echo signals produced by the transmitter/receiver during echo reception and appropriately delays and sums them to form coherent echo signals.

The echo signals produced by the beamformer 16 are coupled to an I,Q demodulator 18. The demodulator 18 demodulates the received echo signals into quadrature components for Doppler processing. The I,Q components are filtered by a wall filter 20 to remove low frequency artifacts stemming from the movement of vessel walls. The filtered I,Q components are then applied to a Doppler shift estimation processor 22 and a Doppler power estimation processor 24.

The Doppler shift estimation processor 22 operates in the conventional manner to estimate a Doppler phase or frequency shift from the I,Q components at each sample volume location of the image field. The sample volume values are applied to a velocity image processor 26 which maps the values to color values for display. The color values are applied to a scan converter and display processor 30 which spatially arranges the color values in the desired image format. The color values are then displayed as pixels on a display 40, wherein each color represents a particular velocity of flow in a particular direction. The color flow velocity display may be overlaid with a structural image of the interior of the body which shows the structure of the vessels or organs which contain the moving fluids.

In accordance with the principles of the present invention the Doppler system of FIG. 1 also includes a color power Doppler subsystem. The color power Doppler subsystem includes a Doppler power estimation processor 24 which estimates the Doppler signal power from the I,Q signal components at each sample volume location using the expression $(I^2+Q^2)^{1/2}$. The Doppler power estimates at each location are averaged with earlier value estimates for the location and mapped to color values for display by a power image processor 28. The color power Doppler values are applied to the scan converter and display processor 30 which spatially arranges the color values in the desired image format. The color values are then displayed as pixels on a display 40, wherein each color represents a particular intensity of Doppler power at a given pixel location.

Figure 2:
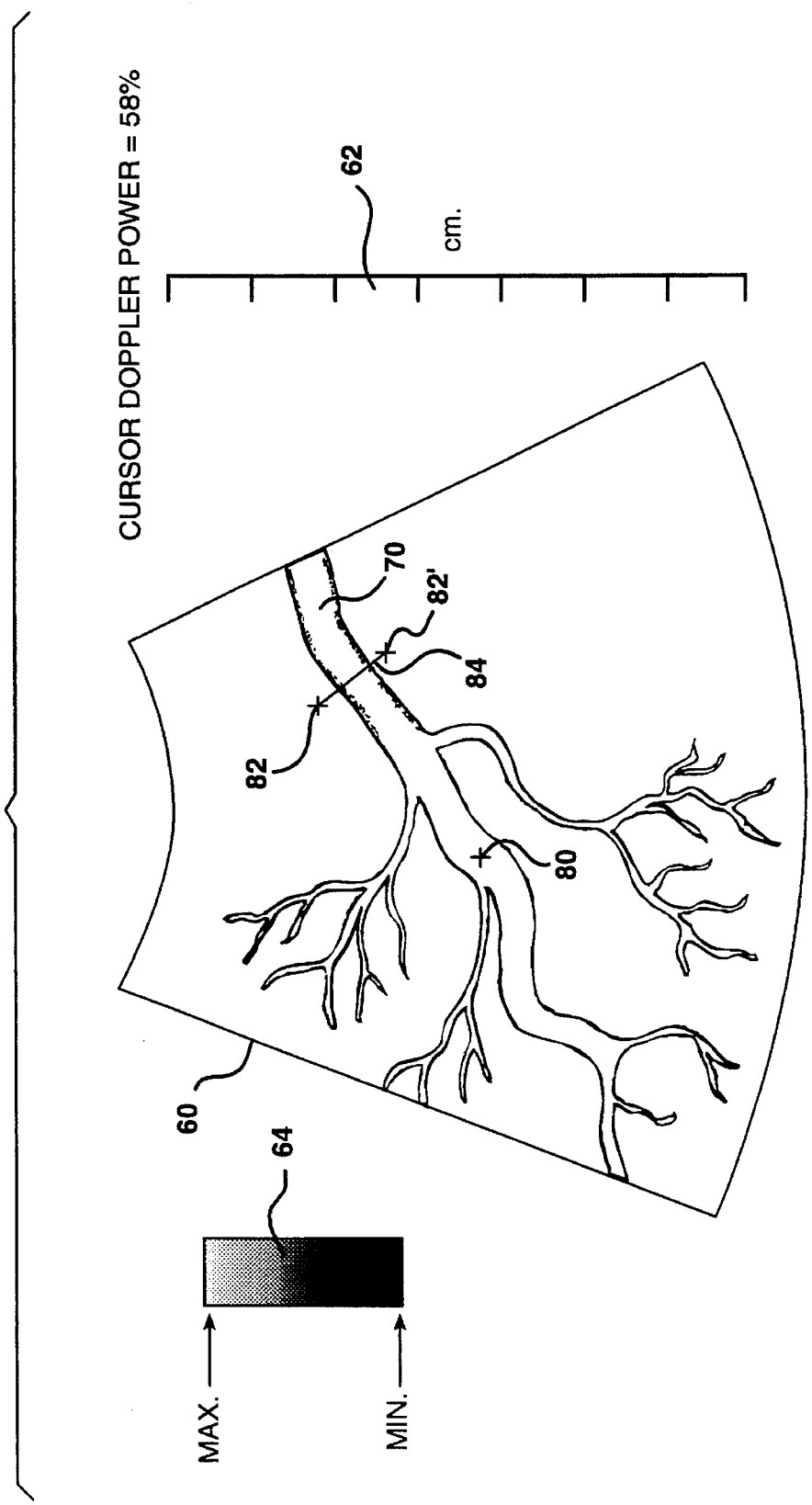
FIG. 2 illustrates the color power Doppler display of the system of FIG. 1.

A Doppler power calibration and measurement subsystem 50 operates on the color pixel information produced by the display processor 30, although this subsystem could also operate on the mapped color power Doppler information of the power image processor 28. The subsystem 50 first calibrates the colors used in the color power Doppler display. Referring to FIG. 2, a color power Doppler display is shown. This display includes a color power Doppler image 20 in a sector format 60, although other formats are well known and could be used. A depth scale 62 is adjacent to the sector and indicates the depth below the probe over which the image extends. This sector image shows a blood vessel 70 which appears as a single large vessel, then separates into many smaller branches. The blood flow of this vasculature is shown in a color power Doppler display format. The colors used to depict the intensities in the Doppler signals are based upon a color bar 64 shown to the left of the image sector 60. In this illustration darker colors indicate low Doppler signal power intensities and lighter colors indicate higher Doppler signal power intensities. To the left of the color bar 64 are two arrows, one indicating a minimum level "min", and the other indicating a maximum level "max".

The subsystem 50 calibrates the color power Doppler display colors by operating on the colors of the color bar 64. By use of the user graphics controls of the ultrasound system's keyboard or mouse the system operator is able to move the "min" arrow up and down along the color bar 64 until it is aligned with the color of the minimum Doppler intensity above which the power Doppler colors are to be calibrated.

Figure 3:
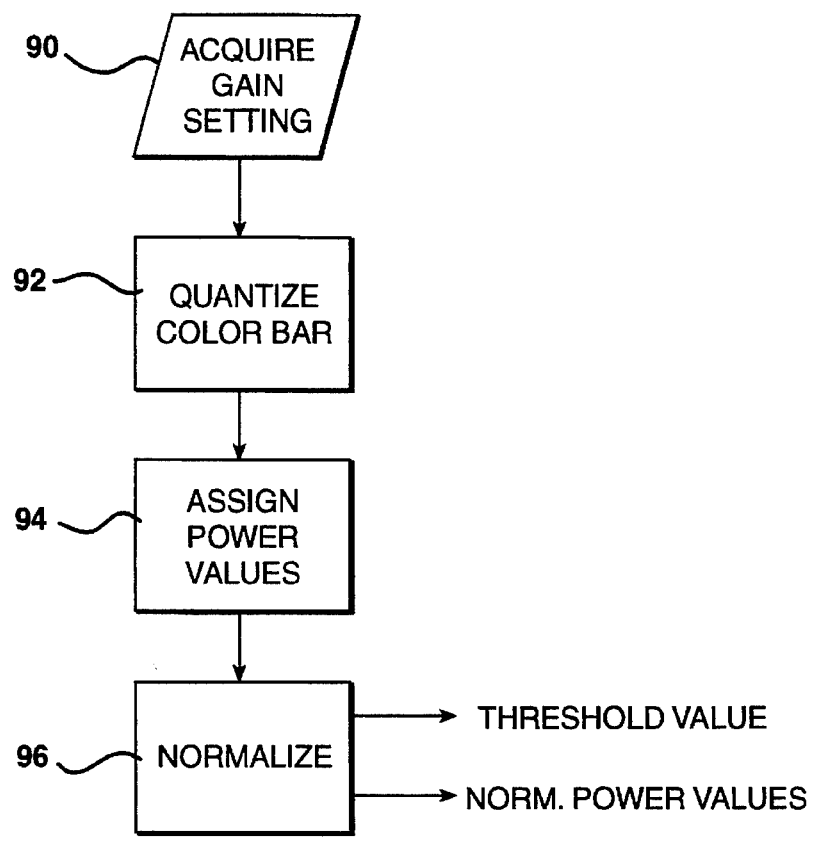
FIG. 3 is a flow chart of the power Doppler calibration sequence of the Doppler power calibrate subsystem of FIG. 1.

The subsystem proceeds with the calibration process shown in the flowchart of FIG. 3. In step 90, the subsystem acquires the color gain value to which the color gain control is set. The gain of the color signals in the displayed image can be set and varied by a color gain control. Usually a maximum setting of this control is 100% of full gain, and lesser settings are expressed in percentages below 100%.

In step 92 the color bar is examined and the range of colors between the "min" and "max" arrows is divided into discrete color values. Maximum power of 100% is divided by the number of discrete color values between the "min" and "max" color values to yield an index. Each discrete color value in the range is then assigned a power value that is a multiple of the index. For instance, if there were twenty discrete color values from "min" to "max" the color value at "min" is assigned a power value of 0%, the color value at "max" is assigned a power value of 100%, and each intermediate color value has an incremental power value which is a multiple of 5%.

In step 94 these power values are normalized as a function of the color gain setting, which was acquired in step 90. For instance, if the color gain was set at 85%, then each power value is multiplied by $^{85}/_{100}$. These normalized power values, expressed in this example as percentages of maximum power, are produced in the form of a lookup table corresponding to their associated discrete color values. The power value at "min" remains zero, and may be used as a threshold value for subsequent color power Doppler measurements.

The lookup table of color values and corresponding power Doppler values are used to quantify and display characteristics of fluid flow in an image such as the vascular structure shown in FIG. 2. For instance, FIG. 2 shows a cursor 80 in the form of a plus sign that can be manipulated over the sector image 60 using a keyboard, mouse or trackball of user graphics controls 52. When the cursor 80 is positioned over the color power Doppler display as shown in the drawing the Doppler power calibration and measurement subsystem 50 detects the color of the image pixel at a predefined point within the cursor area. This color is compared against the calibrated colors of the lookup table until a match is found. The color match will yield the corresponding power Doppler value for that color, and this percentage value is displayed on the image display for the user. By way of example FIG. 2 shows the displayed message "Cursor Doppler power=58%". If the cursor 80 is placed over a pixel with a color that is below the adjustable threshold level "min" a Doppler power of zero is displayed to the user.

This same technique can be applied to a three dimensional color power Doppler display. Instead of two dimensional-pixels, a three dimensional display is generally segmented into three dimensional units called voxels, each of which has a unique three dimensional spatial location in a three dimensional display. The user graphics controls can be used to manipulate the cursor to a desired voxel in such a display, and the quantified power Doppler value displayed from a match of the voxel color to a color and power value in the lookup table.

Figure 4:
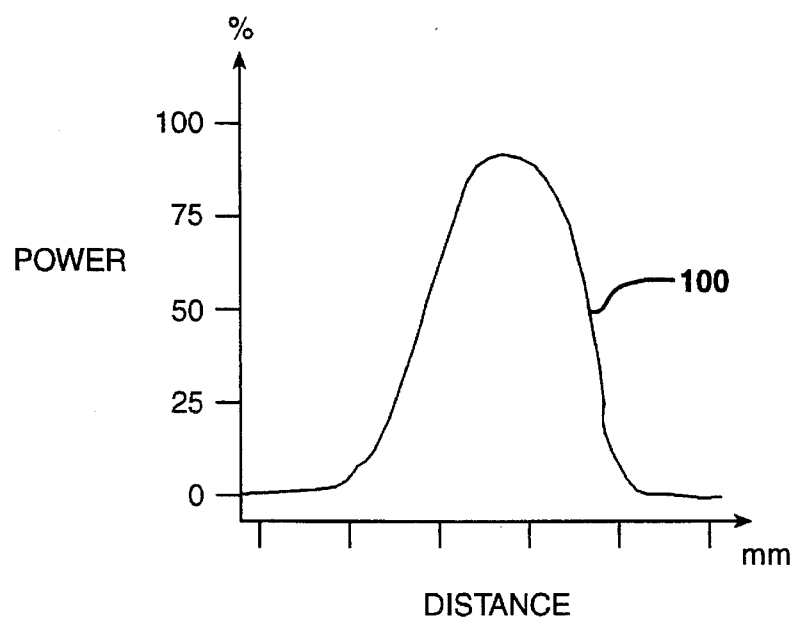
FIG. 4 illustrates an exemplary Doppler power profile across a blood vessel of FIG. 1.

This technique of pixel color comparison can also be used to develop a profile of the Doppler signal intensity across a blood vessel. FIG. 2 shows two cursors 82,82' which are located on the image through manipulation of the user graphics controls, by which a line 84 is automatically drawn to connect the two cursors. The colors of the image pixels along the line 84 are sequentially matched to the colors of the lookup table to yield a sequence of power Doppler values which are graphically plotted and displayed as shown in FIG. 4. The abscissa of the plot is scaled in millimeters as measured by either the depth scale 62 shown to the right of the sector image, or by knowledge of the pixel spacing in relation to the display scale used by the scan converter and display processor 30. Comparing the plotted profile curve 100 of FIG. 4 with the line 84, it is seen that there is no Doppler power emanating from the tissue on either side of blood vessel 70 in the image, and the profile accordingly shows Doppler power levels of 0% at either end of the curve. In this example the profile curve 100 shows a maximum Doppler power level in excess of 75% in the middle of the blood vessel 70. A power Doppler profile curve is fairly stable as compared to a profile curve which might be computed from a color Doppler velocity display, as the color power Doppler display is a relatively steady state display as compared to the pulsatile nature of a color Doppler velocity display.

This technique is also applicable to three dimensional displays. Instead of using a line 84 to intersect a two dimensional image of a blood vessel, a plane is manipulated in three spatial dimensions to intersect the cross sectional area of a blood vessel. In that instance, a family of profile curves 100 can be plotted at parallel spaced intervals across an area corresponding to the intersected lumen of the blood vessel.

Yet another way to quantify blood perfusion is to determine a Doppler power index over an area or volume of vasculature as shown in FIG. 5. This drawing shows an area of the blood vessel structure of the sector image which is outlined by a box 86. The graphical box 86 is drawn, shaped and moved by the user graphics controls 52 to encompass a vascular network 72 in the image. A power index is then calculated for the network 72 inside the box 86 by summing the Doppler power values for all image pixels within the box that exceed the "min" threshold level and dividing this summation by the active area of these pixels multiplied by the number of these pixels, which is the image area occupied by the color power Doppler pixels exceeding the threshold multiplied by the number of these pixels. Stated another way, the power index is $$\text{Power Index} = \frac{\Sigma \text{ Pixel Power}}{(\text{Pixel Area})(\# \text{ Pixels})}$$

The power index is thus a measure of average Doppler power per unit area of the active area of the box which is colored with color power Doppler pixels exceeding the threshold value. The pixel area may be determined by multiplying the area of one pixel by the number of pixels in the box 86 which exhibit a color value in excess of the threshold. The power index is displayed in conjunction with the sector image whenever a power index box or other highlighting graphic is used to make this measurement. The area of the image used to make this measurement can be any area of the image, including the entire image. The power index is believed to provide an index of blood perfusion which is closely related to the mass of blood per unit area.

The power index can also be measured over a highlighted volume of a three dimensional display by summing the Doppler power levels of all voxels contained within the highlighted volume, then dividing this power by the volume multiplied by the number of color power Doppler voxels.

What is claimed is:

1. A method of quantitatively measuring Doppler signal intensity in an ultrasonic color power Doppler display comprising the steps of:

acquiring ultrasonic signals containing Doppler information;

processing said ultrasonic signals to develop a color power Doppler display in which the Doppler power intensity at spatial locations within the display is indicated by different colors;

assigning quantified measures of Doppler power intensity to said different colors;

designating a location in said color power Doppler display at which a Doppler power measurement is to be made; and displaying the quantified measure assigned to the color corresponding to the displayed color at said location.

2. A method of determining a Doppler power index for fluid flow in a region of the body which is imaged in a color power Doppler display comprising the steps of:

acquiring ultrasonic signals containing Doppler information;

processing said ultrasonic signals to develop a color power Doppler display in which the Doppler power intensity at spatial locations within the display is indicated by different colors;

designating a region of said display for which a Doppler power index is to be measured; and displaying a power index which is a function of the power Doppler intensities displayed within said region.

3. The method of claim 2, wherein said step of displaying comprises the step of displaying a power index which is a function of the power Doppler intensities displayed within said region and the portion of said region over which said power Doppler intensities are displayed.

4. A method of determining the flow profile of a fluid in a body cavity which is displayed in an ultrasonic color power Doppler display comprising the steps of:

acquiring ultrasonic signals containing Doppler information;

processing said ultrasonic signals to develop a color power Doppler display in which the Doppler power intensity at spatial locations within the display is indicated by different colors;

assigning quantified measures of Doppler power intensity to said different colors;

designating a region of said color power Doppler display over which a flow profile is to be measured; and displaying a sequence of said quantified measures corresponding to the colors of said designated region.

5. The method of claim 4, wherein said color power Doppler display includes a color power Doppler display of blood flow in a blood vessel;

wherein said step of designating comprises the step of designating a cross section of said blood vessel; and wherein the step of displaying comprises the step of displaying a plot of the Doppler power intensities along said designated cross section.

6. The method of claim 5, wherein said step of designating comprises the step of graphically drawing a line across said blood vessel; and wherein the step of displaying comprises the step of displaying a plot of the Doppler power intensities versus distance along said line.

7. An ultrasonic diagnostic imaging system for quantitatively measuring Doppler power intensity at selected locations in the body comprising:

an ultrasonic probe for acquiring ultrasonic signals containing Doppler information;

a Doppler signal processor for processing said ultrasonic signals to develop a color power Doppler display of a region of the body in which the Doppler power intensity at spatial locations within the display is indicated by different colors;

means for assigning quantified measures of Doppler power intensity to said different colors;

a user control for designating a location in said color power Doppler display at which a Doppler power measurement is to be made; and means for displaying the quantified measure assigned to the color corresponding to the displayed color at said location.

8. An ultrasonic diagnostic imaging system for quantitatively measuring Doppler power in a color power Doppler image of a region of the body of a patient comprising:

an ultrasonic probe for acquiring ultrasonic signals containing Doppler information;

a Doppler signal processor for processing said ultrasonic signals to develop a color power Doppler display of said region of the body in which the Doppler power intensity at spatial locations within the display is indicated by color variations;

means for assigning quantified measures of Doppler power to said color variations;

a user control for designating a region of said color power Doppler display from which a measurement of Doppler power; and a measurement and display system, responsive to said designation of a region of said color power Doppler display which computes a quantified measure of the Doppler power of said region.

9. The ultrasonic diagnostic imaging system of claim 8, wherein said measurement and display system includes a processor responsive to the color power Doppler information displayed within said region to calculate an index measure which is a function of the power Doppler colors displayed within said region and the portion of said region over which said power Doppler colors are displayed.

* * * * *